UNITED STATES PATENT OFFICE.

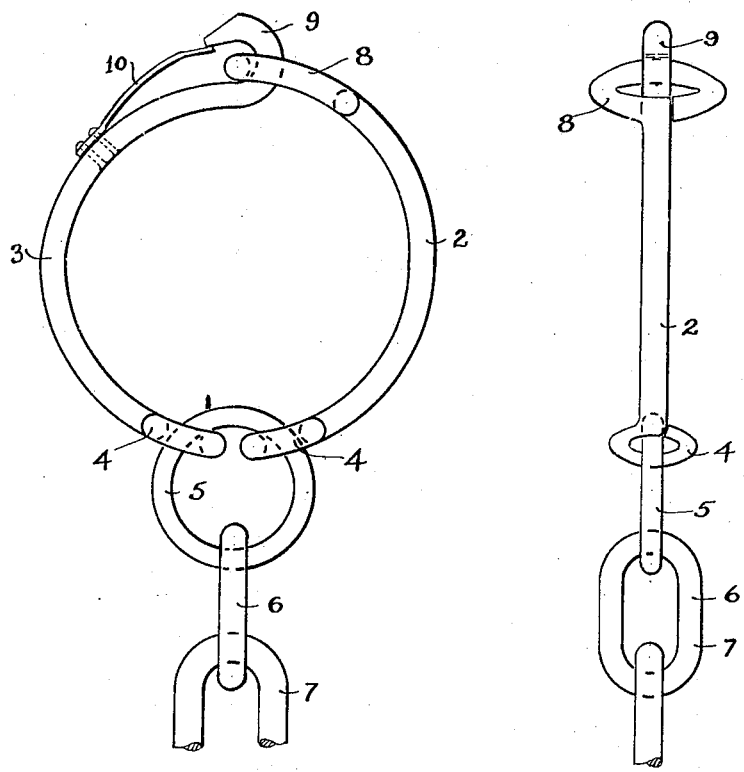

LAURENCE CLARK LUNT, OF NEW HAVEN, CONNECTICUT.

RING USED IN CONNECTION WITH ANIMAL-TRAPS FOR FASTENING END OF CHAIN TO OBJECTS.

1,376,892. Specification of Letters Patent. Patented May 3, 1921.

Application filed July 26, 1919. Serial No. 313,632.

*To all whom it may concern:*

Be it known that I, LAURENCE C. LUNT, a citizen of the United States, residing at New Haven, in the county of New Haven and State of Connecticut, have invented a new and useful Improvement in Rings Used in Connection with Animal-Traps for Fastening End of Chain to Objects; and I do hereby declare the following, when taken in connection with the accompanying drawings and the characters of reference marked thereon, to be a full, clear, and exact description of the same, and which said drawings constitute part of this application, and represent, in—

Figure 1, a view in side elevation of an anchoring-ring constructed in accordance with my invention and shown as attached to the chain of an animal-trap.

Fig. 2, an edge view thereof.

My invention relates to an improvement in anchoring-rings for the chains of animal-traps, the object being to provide a simple, cheap, convenient, and secure device by means of which the chain of an animal-trap may be readily anchored to the stem of a sapling, to a stake driven into the ground, or to some other means of anchorage.

With these ends in view, my invention consists in an anchoring-ring having certain details of construction as will be hereinafter described and pointed out in the claims.

In carrying out my invention, as herein shown, my improved anchoring-ring consists of two, complementary, virtually semi-circular ring-members 2 and 3 preferably adapted in size to together produce a ring, say of three inches in diameter, and therefore large enough to embrace a sapling of moderate size, or to be clasped over a stake or bar driven into the ground in the desired place of setting the trap. The said ring-members are provided at their inner ends with corresponding eyes 4 receiving the coupling-ring 5 of an animal-trap chain, of which only the links 6 and 7 are shown.

The ring-member 2 is formed at its outer end with an eye 8 for the reception of a hook 9 formed upon the outer end of the ring-member 3 and closed by a spring 10, the said hook 9 and spring 10 producing a fastening device of the "snap-hook" type. As thus made and combined the two ring-members are loosely connected together something in the manner of the links of a chain.

It will be readily understood that when the hook 9 is disengaged from the eye 8, the ring-members 2 and 3 may easily be opened out and then clasped around the stem of a sapling or around a post or any other anchorage. After the two members have been clasped around the anchor, they are fastened together by the engagement of the hook 9 with the eye 8.

My improved construction is of extreme simplicity and cheapness, and as convenient as it is secure; it will, of course, be varied in size according to the size of the traps with which it is to be used.

I claim:

1. A two-part anchoring-ring for the chains of animal-traps, the said ring comprising two independently formed substantially semi-circular loosely connected complementary members, each having fastening means at each end, and the fastening means at the outer ends of the respective members constituting the major elements of a snap-fastening.

2. A two-part anchoring-ring for the chains of animal-traps, the said ring comprising two independently formed substantially semi-circular loosely connected complementary ring-members, each formed at its inner end with an eye for the reception of the end member of a chain, and one of the said members being formed at its outer end with the hook member of a snap-hook and the outer end of the other member having an eye for engagement with the said hook, and a spring applied to the said snap-hook hook for closing the same.

LAURENCE CLARK LUNT.